US011486790B2

(12) United States Patent
Zhang et al.

(10) Patent No.: US 11,486,790 B2
(45) Date of Patent: Nov. 1, 2022

(54) LASER MEASURING SYSTEM

(71) Applicant: CHANGZHOU HUADA KEJIE OPTO-ELECTRO INSTRUMENT CO., LTD., Jiangsu (CN)

(72) Inventors: Ou Zhang, Zhejiang (CN); Xiaoming Zong, Jiangsu (CN); Ding Ding, Jiangsu (CN)

(73) Assignee: CHANGZHOU HUADA KEJIE OPTO-ELECTRO INSTRUMENT CO., LTD., Changzhou (CN)

( * ) Notice: Subject to any disclaimer, the term of this patent is extended or adjusted under 35 U.S.C. 154(b) by 1 day.

(21) Appl. No.: 16/960,882

(22) PCT Filed: Dec. 29, 2018

(86) PCT No.: PCT/CN2018/125578
§ 371 (c)(1),
(2) Date: Jul. 8, 2020

(87) PCT Pub. No.: WO2019/137263
PCT Pub. Date: Jul. 18, 2019

(65) Prior Publication Data
US 2021/0080346 A1 Mar. 18, 2021

(30) Foreign Application Priority Data
Jan. 9, 2018 (CN) .......................... 201810019148.8

(51) Int. Cl.
*G01M 11/02* (2006.01)
*G01B 11/30* (2006.01)
(Continued)

(52) U.S. Cl.
CPC ......... *G01M 11/0207* (2013.01); *G01B 11/30* (2013.01); *G01C 15/004* (2013.01); *G02B 27/106* (2013.01)

(58) Field of Classification Search
CPC .. G01M 11/0207; G01B 11/30; G01C 15/004; G02B 27/106; G02B 5/10;
(Continued)

(56) References Cited

U.S. PATENT DOCUMENTS 3,790,258 A * 2/1974 Rambauske ....... G02B 19/0047
359/859
5,659,409 A * 8/1997 Ooi ...................... H04N 9/3105
348/E9.027
(Continued)

FOREIGN PATENT DOCUMENTS

CN 101576414 A * 11/2009 .............. G01J 11/00
CN 104797906 A 7/2015
(Continued)

OTHER PUBLICATIONS

International Search Report and Written Opinion dated Mar. 11, 2019 in corresponding International Patent Application No. PCT/CN2018/125578, filed Dec. 29, 2018, 7 pages.

*Primary Examiner* — Mohamed K Amara
(74) *Attorney, Agent, or Firm* — Dentons US LLP

(57) ABSTRACT

A laser collimation- measuring system, including: a first laser source; a second laser source; a light combining device; a collimator; and a light divergence device. The first laser source and the second laser source emit a first laser and a second laser, respectively, to the light combining device. The first laser and the second laser are transmitted through the light combining device as a third laser and a fourth laser, respectively, and the third laser partially overlaps the fourth laser. The collimator is disposed in a light path of the third and fourth lasers and positioned between the light combining device and the laser divergence device. The laser collimation-measuring system enhances intensity of the laser collimation-measuring system.

8 Claims, 5 Drawing Sheets

(51) Int. Cl.
*G01C 15/00* (2006.01)
*G02B 27/10* (2006.01)

(58) Field of Classification Search
CPC .. G02B 27/1073; G02B 27/145; G02B 27/30; G02B 27/62; G02B 27/1006
See application file for complete search history.

(56) References Cited

U.S. PATENT DOCUMENTS

| | | | | |
|---|---|---|---|---|
| 5,808,759 | A | * | 9/1998 | Okamori ............. G02B 5/0252 348/E9.027 |
| 5,909,316 | A | * | 6/1999 | Watanabe ............ H04N 5/7441 359/619 |
| 7,639,366 | B2 | * | 12/2009 | Spanner ................. G01D 5/26 356/484 |
| 2009/0002692 | A1 | * | 1/2009 | Crompvoets .......... G11B 7/127 356/222 |
| 2012/0090184 | A1 | * | 4/2012 | Zimmermann ........ G01B 11/26 33/291 |
| 2014/0362371 | A1 | | 12/2014 | Qiao et al. |
| 2019/0003828 | A1 | * | 1/2019 | Choiniere ................ G01C 3/08 |

FOREIGN PATENT DOCUMENTS

| | | | | | |
|---|---|---|---|---|---|
| CN | 205718972 | U | | 11/2016 | |
| CN | 106707479 | A | * | 5/2017 | ............. G02B 19/00 |
| CN | 108007396 | A | | 5/2018 | |
| CN | 108007397 | A | | 5/2018 | |
| CN | 109490201 | B | * | 5/2020 | ......... G01B 11/2441 |
| CN | 215219331 | U | * | 12/2021 | ............. G02B 27/09 |
| EP | 2202545 | A1 | * | 6/2010 | ............. G02B 5/001 |
| WO | 02/40938 | A2 | | 5/2002 | |

\* cited by examiner

LASER MEASURING SYSTEM

CROSS-REFERENCE TO PRIOR APPLICATIONS

This application is a National Stage of PCT/CN2018/125578, filed Dec. 29, 2018, and designating the United States of America (published on Jul. 18, 2019, as WO 2019/137263A1), which claims priority under 35 U.S.C. § 119 to Chinese Patent Application No. 201810019148.8, filed Jan. 9, 2018, each hereby expressly incorporated by reference in its entirety and each assigned to the assignee hereof.

TECHNICAL FIELD

The present invention relates to the technical field of laser, and in particular, to a laser collimation-measuring system.

BACKGROUND

Laser is anther important human invention after nuclear energy, computers and semiconductors since the 20th century. It is known as "the fastest knife", "the most accurate ruler" and the brightest light". The light is radiated through simulation of atoms, so it is named "laser".

With the development up to now, laser technology has been widely applied in various aspects, for example, laser marking, laser welding, laser cutting, optical fiber communication, laser spectrum, laser ranging, laser radars, laser weapons, laser discs, laser indicators and the like. Laser collimation measurement is also a major aspect of laser application.

In the laser collimation measurement application, laser planeness measurement and collimation measurement are often used. The planeness refers to deviation of macroscopic irregularity height of a substrate relative to an ideal plane. A tolerance zone refers to a region between two parallel planes which are apart from each other by a tolerance value. The planeness belongs to a shape error in a shape and position error. Different from other methods for measuring the planeness, laser planeness measurement has the advantages of high efficiency and convenience.

In the prior art, laser planeness measurement usually adopts an interference method or takes a light beam formed spatially by directionally emitting a laser beam as a base line of collimation. The limitation of using the former is that the interference method usually can only be applied to small-area measurement, while the problem of using the latter is that since the laser emitted from the single laser source is elliptic, an error may occur often due to non-uniformity of two sides of the laser during collimation measurement, and the laser emitted from single laser source has low intensity and is prone to interference.

Therefore, a high-precision laser collimation-measuring system is required.

SUMMARY

To overcome the above technical defects, an objective of the present invention is to provide a laser collimation-measuring system.

The present invention discloses a laser collimation-measuring system. The laser collimation-measuring system includes: a first laser source, and further includes a second laser source and a light combining device, wherein the first laser source and the second laser source respectively emit first laser and second laser to the light combining device; third laser and fourth laser are respectively generated after the first laser and the second laser pass through the light combining device; and the third laser partially overlaps the fourth laser. Preferably, the light combining device is internally provided with at least a first reflector and a second reflector, the first reflector and the second reflector being parallel to each other.

Preferably, the first laser and the second laser are respectively emitted to the first reflector and the second reflector; directions of the laser emitted to the first reflector and the second reflector are respectively a first light incoming direction and a second light incoming direction, and directions after reflection by the reflectors are respectively a first light outgoing direction and a second light outgoing direction; the first reflector is disposed at a position where the first reflector and the first light incoming direction form a 45° included angle, and the second reflector is disposed at a position where the second reflector and the second light incoming direction form a 45° included angle; and the first light incoming direction is orthogonal to the first light outgoing direction, and the second light incoming direction is orthogonal to the second light outgoing direction.

Preferably, incident points of the first laser and the second laser emitted to the first reflector and the second reflector are respectively a first incident point and a second incident point; and the first laser source and the second laser source are disposed at a position where a straight line of the first incident point and the second incident point and the first reflector or the second reflector forms a 45° included angle.

Preferably, the laser collimation-measuring system further includes a collimating mirror, wherein the collimating mirror is disposed in the middle of the light combining device and a laser divergence device and is positioned on a light path of the third laser and the fourth laser.

Preferably, shapes of the third laser and the fourth laser projected on the collimating mirror are respectively a first ellipse and a second ellipse, the first ellipse partially overlapping the second ellipse.

Preferably, straight lines where long axes of the first ellipse and the second ellipse are located are respectively a first long axis and a second long axis; and the first long axis and the second long axis are intersected at a first intersection point and average a round angle where the first intersection point is located. Preferably, the laser collimation-measuring system further includes a third laser source, wherein laser emitted by the third laser source, the first laser and the second laser are simultaneously emitted to the light combining device and fifth laser is generated after reflection by the light combining device. A shape of the fifth laser projected on the collimating mirror is a third ellipse and the third ellipse partially overlaps the first ellipse and the second ellipse.

Preferably, straight lines wherein long axes of the first ellipse, the second ellipse and the third ellipse are located are respectively a first long axis, a second long axis and a third long axis; and the first long axis, the second long axis and the third long axis are intersected at a second intersection point and average a round angle where the second intersection point is located.

Preferably, the laser collimation-measuring system further includes a conical mirror, wherein the conical mirror is disposed on a light path of the third laser and the fourth laser, a conical tip of the conical mirror faces the light combining device, the third laser and the fourth laser are emitted to the conical tip, and multiple beams of laser covering the same plane are scattered at a conical bottom after divergence by the conical mirror.

By adoption of the above technical solutions, compared with the prior art, the present invention has the following beneficial effects:

1. the interference resistance of the laser is enhanced; and
2. the two sides of a overlapping part of the laser are uniform, thereby improving the accuracy of collimation measurement.

Figure 1:
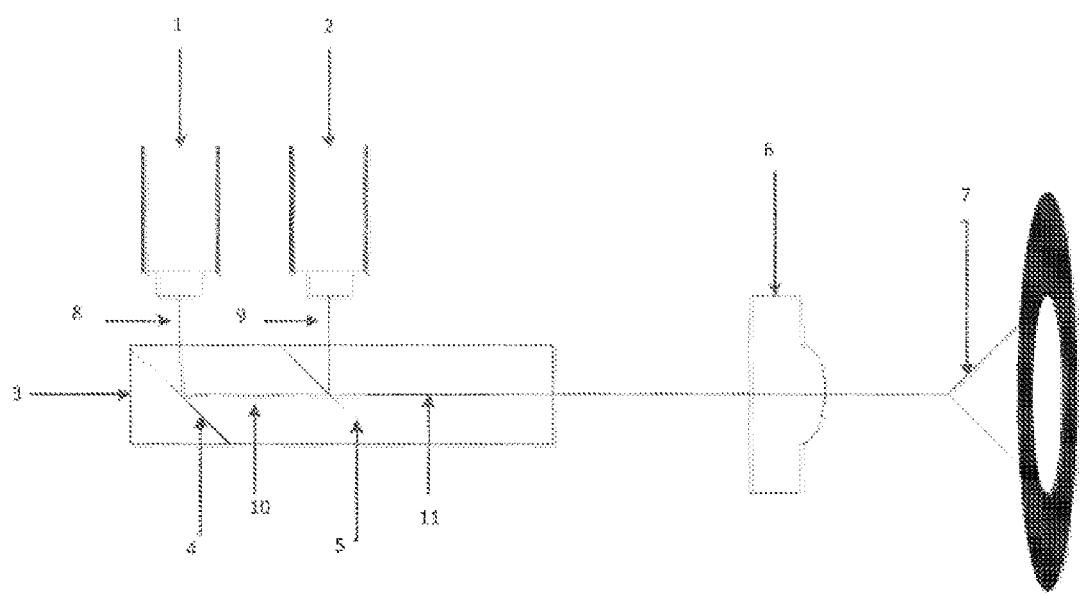
FIG. 1 is a schematic structural diagram of a laser collimation-measuring system according to a preferred embodiment of the present disclosure.

Reference numerals: 1 first laser source; 2 second laser source; 3 light combining device; 4 first reflector; 5 second reflector; 6 collimating mirror; 7 conical mirror; 8 first laser beam; 9 second laser beam; 10 third laser beam; 11 fourth laser beam; 12 third laser source; 13 fifth laser beam; 14 first ellipse; 15 second ellipse; 16 third ellipse.

DETAILED DESCRIPTION

The advantages of the present invention will be further described in detail below with reference to the accompanying drawings and specific embodiments.

Description will be made in detail to exemplary embodiments, examples of which are illustrated in the accompanying drawings. When the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the present disclosure as recited in the appended claims.

The terms used in the present disclosure are merely for the purpose of describing specific embodiments and are not intended to limit the present disclosure. As used in the present disclosure and the appended claims, the singular forms "a", "an" and "the" are intended to include plural forms, unless the context clearly indicates other meanings. It should be understood that the term "and/or" used herein refers to and includes any or all possible combinations of one or more of the associated listed items.

It should be understood that, although terms first, second, third and the like may be used in the present disclosure to describe various kinds of information which shall not be limited to these terms. These terms are only used to distinguish the same type of information from each other. For example, without departing from the scope of the present disclosure, first information may also be referred to as second information; and similarly, the second information may also be referred to as the first information. Depending on the context, the word "if" used herein may be interpreted as "when" or "in response to determination". In the description of the present invention, it should be understood that orientations or position relationships indicated by terms "longitudinal", "transverse", "upper", "lower", "front", "rear", "left", "right", "vertical", "horizontal", "top", "bottom", "inside", "outside" and the like are orientations or position relationships shown in the drawings, and these terms are merely for facilitating description of the present invention and simplifying the description, but not for indicating or implying that the mentioned device or elements must have a specific orientation and must be established and operated in a specific orientation, and thus, these terms cannot be understood as a limitation to the present invention.

In the description of the present invention, otherwise specified and defined, it should be noted that the terms "mounting", "connected" and "connection" should be understood in a broad sense, for example, may be mechanical connection or electric connection and may also be internal communication of two components, and may be direct connection and may also be indirect connection through an intermediary. For those of ordinary skill in the art may understand the specific meanings of the above terms according to specific conditions.

In the subsequent description, suffixes such as "module", "part" or "unit" for representing components are merely for facilitating the description of the present invention and have no specific meanings in themselves. Therefore, "module" and "part" may be used in a mixed way.

Specifically, referring to FIG. 1 which is A schematic structural diagram of a laser collimation-measuring system according to a preferred embodiment of the present disclosure. The laser collimation-measuring system includes a first laser source 1 and further includes a second laser source 2 and a light combining device 3, wherein the first laser source 1 and the second laser source 2 respectively emit first laser beam 8 and second laser beam 9 to the light combining device 3; third laser beam 10 and fourth laser beam 11 are respectively generated after the first laser beam 8 and the second laser beam 9 pass through the light combining device 3; and the third laser beam 10 partially overlaps the fourth laser beam 11.

More specifically, in the prior art, single laser is generally used for direct collimation measurement, for examples: measuring whether several points are on a fixed straight line and measuring planeness; however, the disadvantages of using the single laser are that the laser with limited intensity is prone to interference, and non-uniformity of two sides will result in low measurement precision because the laser emitted by the general laser diode is elliptical. Therefore, the main improvement of the laser collimation-measuring system provided by the present invention is to use a plurality of laser sources to emit laser in an overlapping manner, thereby enhancing the light intensity of the laser and enabling the laser to have high ability of resisting external stray light; in addition, the overlapping part enables the two sides of the laser of the overlapping part to have uniform light intensity, thereby solving the problem in the prior art. In the embodiment shown in FIG. 1, two laser sources are provided and are respectively a first laser source 1 and a second laser source 2. In order that a first laser beam 8 and a second laser beam 9 emitted by the first laser source 1 and the second laser source 2 can be combined into one beam of laser, that is the first laser beam 8 partially overlaps the second laser beam 9, the laser collimation-measuring system further includes a light combining device 3, wherein the first laser beam 8 and the second laser beam 9 respectively generate a third laser beam 10 and a fourth laser beam 11 after the action of the light combining device 3. Of course, the first laser source 1 and the second laser source 2 are required to be disposed at proper positions at this time, such that the third laser beam 10 partially overlaps the fourth laser beam 11. It should be noted herein that cross sections of the two laser beams partially overlap in a mutually crossed manner and the overlapping part is nearly circular; moreover, the bigger the overlapping part is, the better the technical effect is. Due to overlapping in this way, while the light intensity is improved, the overlapping part is nearly circular, which has the advantage that the two sides of the laser are uniform in order to avoid the error generated by non-uniformity of the two sides of the laser in the prior art.

Specifically, the light combining device 3 is internally provided with at least a first reflector 4 and a second reflector 5, the first reflector 4 and the second reflector 5 being parallel to each other.

More specifically, referring to FIG. 1, the light combining device 3 is provided with two parallel first reflector 4 and second reflector 5 so as to enable the first laser beam 8 and the second laser beam 9 to be combined into two laser beams which partially overlap. The reason why the first reflector 4 and the second reflector 5 are arranged in parallel is that when the first reflector 4 and the second reflector 5 are parallel to each other, directions of the reflected laser are the same, and thus, the directions of the reflected laser are easier to control, and the first laser beam 8 and the second laser beam 9 are combined into two laser beams which partially overlap.

Specifically, the first laser beam 8 and the second laser beam 9 are respectively emitted to the first reflector 4 and the second reflector 5; directions of the laser emitted to the first reflector 4 and the second reflector 5 are respectively a first light incoming direction and a second light incoming direction, and directions after reflection by the reflectors are respectively a first light outgoing direction and a second light outgoing direction; the first reflector 4 is disposed at a position where the first reflector 4 and the first light incoming direction form a 45° included angle, and the second reflector 5 is disposed at a position where the second reflector 5 and the second light incoming direction form a 45° included angle; and the first light incoming direction is orthogonal to the first light outgoing direction, and the second light incoming direction is orthogonal to the second light outgoing direction.

More specifically, the light combining device 3 is further defined herein, the directions in which the first laser beam 8 and the second laser beam 9 are emitted to the first reflector 4 and the second reflector 5 are taken as the first light incoming direction and the second light incoming direction, the directions after reflection are taken as the first light outgoing direction and the second light outgoing direction, and the first reflector 4 and the second reflector 5 are defined to form a 45° included angle respectively with the first light incoming direction and the second light incoming direction, such that the direction of the reflected laser is orthogonal to the direction of the incident laser after the laser is incident; meanwhile, according to the above definition that the first reflector 4 and the second reflector 5 are parallel to each other, definition that the first laser beam 8 and the second laser beam 9 are parallel to each is obtained. The final effect is that the first light incoming direction is orthogonal to the first light outgoing direction, and the second light incoming direction is orthogonal to the second light outgoing direction, that is the direction of the first laser beam 8 is orthogonal to the direction of the third laser beam 10, and the direction of the second laser beam 9 is orthogonal to the direction of the fourth laser beam 11. The advantage of defining orthogonality lies in that such an angle is controlled better and a frame of the light combining device 3 is manufactured easily. Specifically, incident points of the first laser beam 8 and the second laser beam 9 emitted to the first reflector 4 and the second reflector 5 are respectively a first incident point and a second incident point; and the first laser source 1 and the second laser source 2 are disposed at a position where a straight line of the first incident point and the second incident point and the first reflector 4 or the second reflector 5 forms a 45° included angle.

More specifically, an incident point of the first laser beam 8 emitted to the first reflector 4 is taken as a first incident point, an incident point of the second laser beam 9 emitted to the second reflector 5 is a second incident point, and the first laser source 1 and the second laser source 2 are disposed at a position where a straight line of the first incident point and the second incident point and the first reflector 4 or the second reflector 5 forms a 45° included angle. Such definition aims to define that the third laser beam 10 and the fourth laser beam 11 generated after the reflection of the first laser beam 8 and the second laser beam 9 can converge into one beam of laser, that is the third laser beam 10 partially overlap the fourth laser beam 11. Specifically, the laser collimation-measuring system further includes a collimating mirror 6, wherein the collimating mirror 6 is disposed in the middle of the light combining device 3 and a laser divergence device and is positioned on a light path of the third laser and the fourth laser.

More specifically, the collimating mirror 6 is used for changing the divergent light into parallel light. In the embodiment, such an arrangement improves the technical effect due to that the laser is not liable to shift towards other directions after the divergent light is changed into the parallel light, thereby enhancing the accuracy of the final result in the next measurement.

Figure 3:
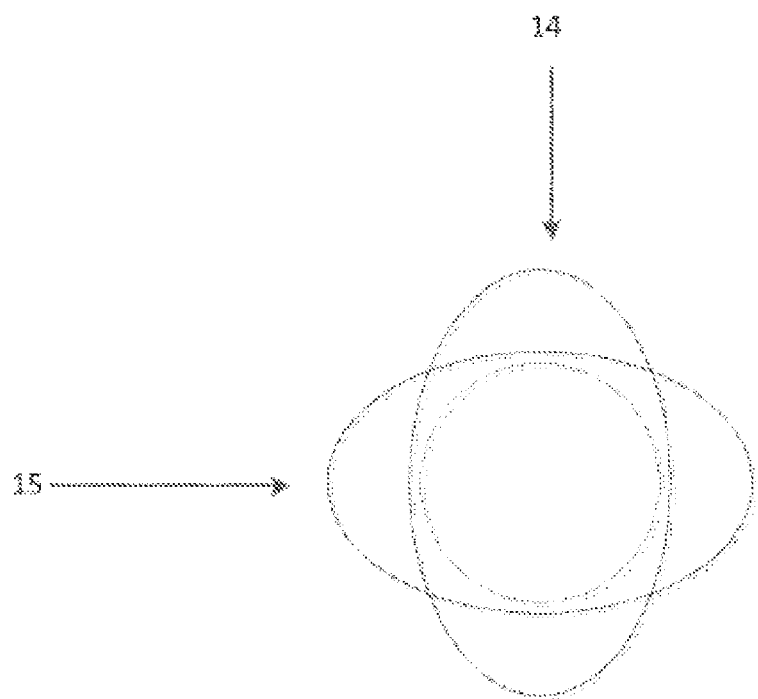
FIG. 3 is a schematic structural diagram that a first ellipse and a second ellipse partially overlap on a collimating mirror according to a preferred embodiment of the present disclosure.

Specifically, referring to FIG. 3, shapes of the third laser beam 10 and the fourth laser beam 11 projected on the collimating mirror 6 are respectively a first ellipse 14 and a second ellipse 15, the first ellipse 14 partially overlapping the second ellipse 15.

More specifically, since a cross section of the laser is elliptical when the laser source is emitted, shapes of the third laser beam 10 and the fourth laser beam 11 projected on the collimating mirror 6 are respectively a first ellipse 14 and a second ellipse 15. As the third laser beam 10 partially overlaps the fourth laser source 11, the first ellipse 14 and the second ellipse 15 projected on the collimating mirror 6 partially overlap. It should be noted herein that the better situation is that the first ellipse 14 overlaps the second ellipse 15 in a crossed manner and the overlapping part is nearly circular. Due to overlapping in this way, while the light intensity is improved, the overlapping part is nearly circular, which has the advantage that the two sides of the laser are uniform in order to avoid the error generated by non-uniformity of the two sides of the laser in the prior art.

Specifically, referring to FIG. 3, straight lines where long axes of the first ellipse 14 and the second ellipse 15 are located are respectively a first long axis and a second long axis; and the first long axis and the second long axis are intersected at a first intersection point and average a round angle where the first intersection point is located.

More specifically, to optimize the above better overlapping situation, straight lines where long axes of the first ellipse 14 and the second ellipse 15 are located are respectively taken as a first long axis and a second long axis; and the first long axis and the second long axis average a round angle where the first intersection point is located. For example, in the embodiment, the round angle is averaged by the two long axes into four angles, each of which is 90°. In this way, the overlapping position of the ellipses is described in detail through definition on the original basis. In this case, the nearly circular shape of the overlapping part of the first ellipse 14 and the second ellipse 15 is larger and closer to a circular shape compared with the nearly circular shape obtained by overlapping in other ways. The laser beam obtained in this way has high interference resistance in the use process and the two sides of the laser are more uniform, which is also an important aspect of the present invention different from the prior art.

Figure 2:
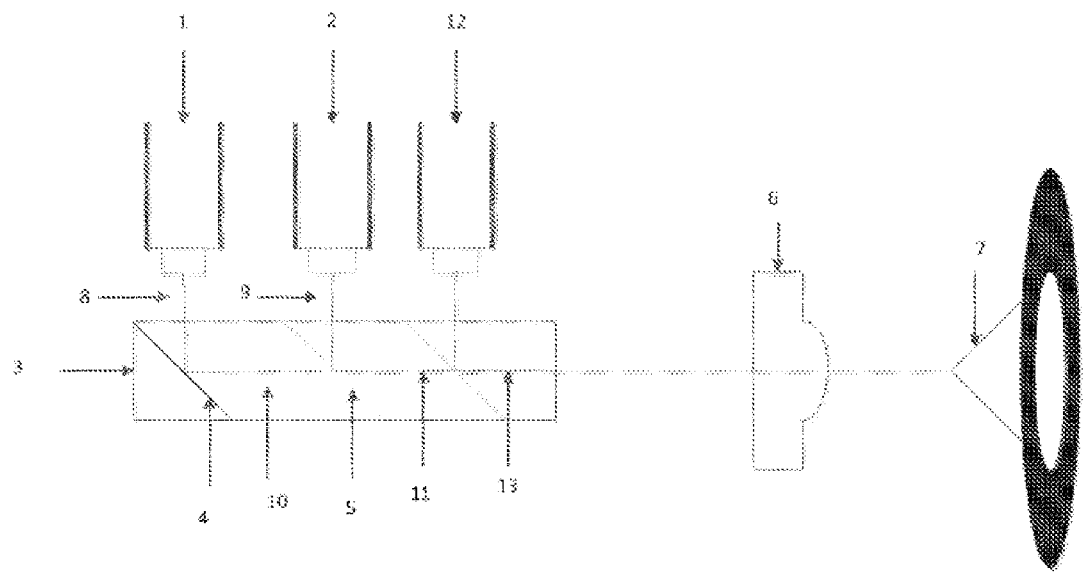
FIG. 2 is a schematic structural diagram of a laser collimation-measuring system according to a preferred embodiment of the present disclosure.
Figure 4:
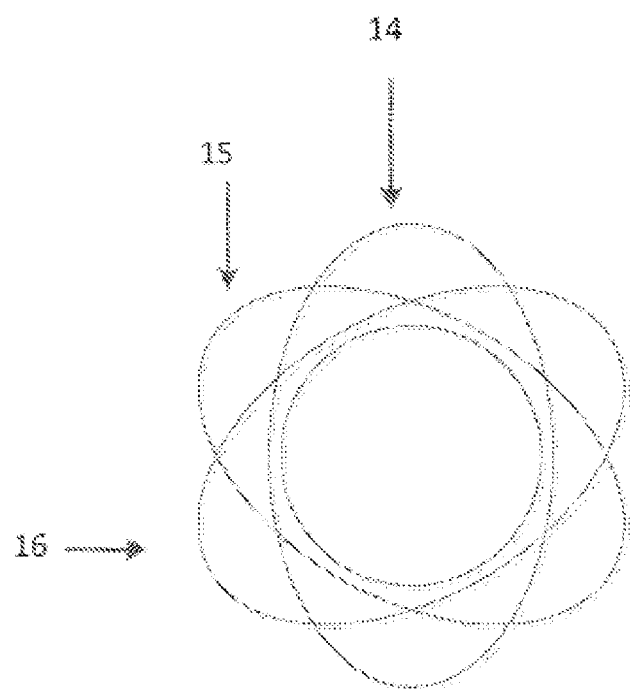
FIG. 4 is a schematic structural diagram that a first ellipse, a second ellipse and a third ellipse partially overlap on a collimating mirror according to a preferred embodiment of the present disclosure.

Specifically, referring to FIG. 2 and FIG. 4, the laser collimation-measuring system further includes a third laser source 12, wherein laser emitted by the third laser source 12, the first laser beam 8 and the second laser beam 9 are emitted to the light combining device 3 simultaneously; a fifth laser beam 13 is generated after reflection by the light combining device 3; a shape of the fifth laser beam 13 projected on the collimating mirror 6 is a third ellipse 16; and the third ellipse 16 partially overlaps the first ellipse 14 and the second ellipse 15.

More specifically, in the embodiment as shown in FIG. 2, three laser sources are provided and are respectively a first laser source 1, a second laser source 2 and a third laser source 12. In order that laser beams emitted by the first laser source 1, the second laser source 2 and the third laser source 12 can be combined into one beam of laser, that is the three beams of laser can partially overlap, the laser collimation-measuring system further includes a light combining device 3. The laser beams are emitted to the light combining device 3 at the same time; after the action of the light combining device 3, the first laser beam 8 and the second laser beam 9 respectively generate a third laser beam 10 and a fourth laser beam 11, the laser beam emitted by the third laser source 12 generates a fifth laser beam 13; of course, the first laser source 1, the second laser source 2 and the third laser source 10 are required to be at a proper position, so that the third laser beam 10, the fourth laser beam 11 and the fifth laser beam 13 partially overlap. Since a cross section of the laser is elliptical when the laser source is emitted, shapes of the third laser beam 10, the fourth laser beam 11 and the fifth laser beam 13 emitted to the collimating mirror 6 are respectively a first ellipse 14, a second ellipse 15 and a third ellipse 16. As the third laser beam 10, the fourth laser source 11 and the fifth laser beam 13 partially overlap, the first ellipse 14, the second ellipse 15 and the third ellipse 16 projected on the collimating mirror 6 partially overlap. It should be noted herein that the better situation is that the first ellipse 14, the second ellipse 15 and the third ellipse overlap in a crossed manner and the overlapping part is nearly circular. Due to overlapping in this way, while the light intensity is improved, the overlapped part is nearly circular, which has the advantage that the two sides of the laser are uniform in order to avoid the error generated by non-uniformity of the two sides of the laser in the prior art.

Specifically, straight lines where long axes of the first ellipse 14, the second ellipse 15 and the third ellipse 16 are located are respectively a first long axis, a second long axis and a third long axis. The first long axis, the second long axis and the third long axis are intersected at a second intersection point and average a round angle where the second intersection point is located.

More specifically, referring to FIG. 4, to optimize the above better overlapping situation, straight lines where long axes of the first ellipse 14, the second ellipse 15 and the third ellipse 16 are located are respectively taken as a first long axis, a second long axis and a third long axis, and the first long axis, the second long axis and the third long axis average a round angle where the second intersection point is located. In the embodiment, the round angle is averaged by the three long axes into six angles, each of which is 60°. Similarly, in the case of four ellipses, the round angle is averaged by four long axes into eight angles, each of which is 45°. In this way, the overlapping position of the ellipses is described in detail through definition on the original basis. In this case, the nearly circular shape of the overlapping part of the first ellipse 14, the second ellipse 15 and the third ellipse 16 is larger and closer to a circular shape compared with the nearly circular shape obtained by overlapping in other ways. The laser beam obtained in this way has high interference resistance in the use process and the two sides of the laser are more uniform, which is also an important aspect of the present invention different from the prior art.

Figure 5:
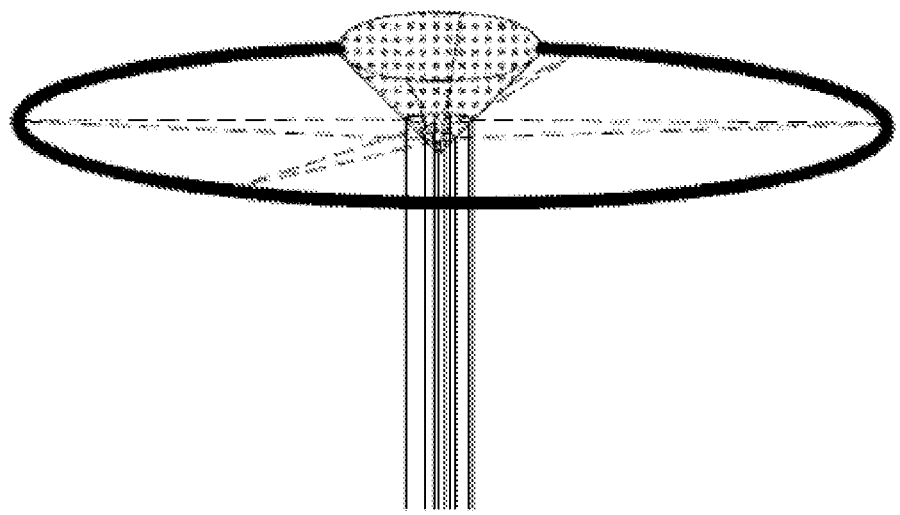
FIG. 5 is a schematic structural diagram that a conical mirror scatters laser.

Specifically, referring to FIG. 1 and FIG. 2, the laser collimation-measuring system further includes a conical mirror 7, wherein the conical mirror 7 is disposed on a light path of the third laser and the fourth laser; a conical tip of the conical mirror 7 faces the light combining device 3; and the third laser and the fourth laser are emitted to the conical tip. Referring to FIG. 5, multiple beams of laser covering the same plane are scattered at a conical bottom after divergence by the conical mirror 7.

More specifically, in the embodiment, a laser collimation-measuring system for measuring planeness is further provided. The laser collimation-measuring system for measuring planeness is provided with a conical mirror 7, wherein a conical tip of the conical mirror 7 faces the light combining device 3; and after the laser is emitted to the conical tip, multiple beams of laser covering the same plane are scattered at a conical bottom of the conical mirror 7 through optical scattering of the conical mirror 7. The "laser surface" may be applied to planeness measurement or other scenes required to be covered with laser in the form of a plane, thereby improving a limitation that the interference method in the prior art can only be applied to small-area measurement. Meanwhile, due to multi-laser overlapping, the plane light intensity of the laser surface is uniform, thereby avoiding the situation of non-uniformity of two sides during use of single laser. It should be noted that the embodiments of the present invention have optimal implementation and do not limit the present invention in any forms. Any person skilled in the art may change or modify the embodiments into equivalent effective embodiments by the technical contents disclosed above. Any modifications or equivalent variations and embellishes made on the above embodiments according to the technical essence of the present invention are within the scope of the technical solution of the present invention without departing from the contents of the technical solution of the present invention.

The invention claimed is:
1. A laser collimation-measuring system, comprising:
a first laser source;
a second laser source;
a light combining device;,
a collimator; and
a light divergence device, wherein the first laser source and the second laser source emit a first laser and a second laser, respectively, to the light combining device;

wherein the first laser and the second laser are transmitted from the light combining device as a third laser and a fourth laser, respectively, wherein the third laser partially overlaps the fourth laser, wherein the collimator is disposed in a light path of the third and fourth lasers and positioned between the light combining device and the laser divergence device, wherein the laser divergence device is a conical mirror, wherein a conical tip of the conical mirror faces the light combining device, wherein the third laser and the fourth laser are incident on the conical tip after passing through a collimator, and wherein the third and fourth lasers incident on the conical tip are scattered at a conical bottom of the conical mirror through divergence of the conical mirror, such that laser collimation-measuring system measures planeness via an interference method including a uniform plane light intensity in an overlapping portion.

2. The laser collimation-measuring system according to claim 1, wherein
the light combining device comprises at least a first reflector and a second reflector, and
the first reflector and the second reflector are parallel to each other.

3. The laser collimation-measuring system according to claim 2, wherein:
the first laser and the second laser are emitted to the first reflector and the second reflector, respectively,
a direction of the first laser emitted to the first reflector is a first light incoming direction and a direction of the second laser emitted to the second reflector is a second light incoming direction,
a direction of the first laser reflected from the first reflector is a first light outgoing direction and a direction of the second laser reflected from the second reflector is a second light outgoing direction,
the first reflector is positioned to form a 45° angle with the first light incoming direction,
the second reflector is positioned to form a 45° angle with the second light incoming direction, and
the first light incoming direction is orthogonal to the first light outgoing direction, and the second light incoming direction is orthogonal to the second light outgoing direction.

4. The laser collimation-measuring system according to claim 3, wherein:
the first laser is incident on the first reflector at a first incident point and the second laser is incident on the second reflector at a second incident point, and
the first laser source is disposed such that a plane including the first incident point forms a 45° angle with the first reflector and the second laser source is disposed such that a plane including the second incident point forms a 45° angle with the second reflector.

5. The laser collimation-measuring system according to claim 1, wherein:
the third laser and the fourth laser form a first ellipse and a second ellipse, respectively, when projected on the collimato, and
the first ellipse partially overlaps the second ellipse.

6. The laser collimation-measuring system according to claim 5, wherein:
the first ellipse has a first long axis and the second ellipse has a second long axis, and the first long axis and the second long axis intersect at a first intersection point to form four 90° angles such that an overlapping portion of the first ellipse and the second ellipse forms a circular shape.

7. The laser collimation-measuring system according to claim 5, further comprising:
a third laser source, wherein the third laser source emits a fifth laser,
wherein the first laser, the second laser and the fifth laser are simultaneously emitted to the light combining device,
wherein the fifth laser is transmitted from the light combining device as a sixth laser, and
wherein the sixth laser forms a third ellipse when projected on the collimator, and the third ellipse partially overlaps the first ellipse and the second ellipse.

8. The laser collimation-measuring system according to claim 7, wherein:
wherein the first ellipse has a first long axis, the second ellipse has a second long axis and the third ellipse has a third long axis, and
wherein the first long axis, the second long axis and the third long axis intersect at a second intersection point to form six 60° angles such that an overlapping portion of the first to third ellipses forms a circular shape.

* * * * *